United States Patent Office 3,565,902
Patented Feb. 23, 1971

3,565,902
1,2-DIHYDRO-3H-IMIDAZO[1,5-a]INDOL-3-ONES AND 3-THIONES
William Blythe Wright, Jr., Woodcliff Lake, N.J., assignor to American Cyanamid Company, Stamford, Conn., a corporation of Maine
No Drawing. Filed Sept. 15, 1967, Ser. No. 668,205
Int. Cl. C07d 49/30
U.S. Cl. 260—294    10 Claims

ABSTRACT OF THE DISCLOSURE

The preparation of substituted imidazo[1,5-a]indol-3-ones, imidazo[1,5-a]indol - 3 - thiones, intermediates and addition salts, are described. These compounds are useful for their CNS depressant and tranquilizer properties.

---

This application is a continuation-in-part of application Ser. No. 591,971, filed Nov. 4, 1966 now abandoned.

SUMMARY OF THE INVENTION

The compounds of this invention may be illustrated by the following general formula:

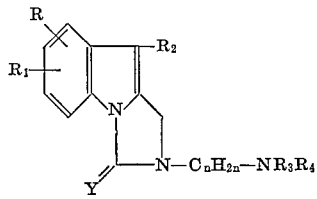

wherein R and $R_1$ are selected from the group consisting of hydrogen, halogen, lower alkyl, lower alkoxy, lower alkylthio and trifluoromethyl; $R_2$ is selected from the group consisting of hydrogen and lower alkyl; Y is selected from the group consisting of oxygen or sulfur; $n$ is an integer of 1 to 4; and $R_3$ and $R_4$ are selected from the group consisting of hydrogen, lower alkyl, lower alkenyl, cycloalkyl, aralkyl, lower cycloalkylmethyl, and when taken together with the nitrogen, are 1 - pyrrolidinyl, lower alkyl - 1 - pyrrolidinyl, piperidino, lower alkylpiperidino, morpholino, lower alkylmorpholino, hexamethyleneimino, 1 - piperazinyl, 1 - (lower alkyl) - 4 - piperazinyl, 1 - (hydroxy lower alkyl) - 4 - piperazinyl, 1- (lower alkanoyloxyalkyl) - 4 - piperazinyl, 1 - phenyl - 4 - piperazinyl, 1 - (lower alkoxyphenyl) - 4 - piperazinyl, 1 - trifluoromethylphenyl - 4 - piperazinyl, 1 - (lower alkylphenyl) - 4 - piperazinyl, 1 - halophenyl - 4 - piperazinyl, 4 - phenyl - 1,2,5,6 - tetrahydro - 1 - pyridinyl, 4 - alkylphenyl - 1,2,5,6 - tetrahydro - 1 - pyridinyl, 4- halophenyl - 1,2,5,6 -tetrahydro - 1 - pyridinyl, 4 - (lower alkoxyphenyl) - 1,2,5,6 - tetrahydro - 1 - pyridinyl, 4- trifluoromethylphenyl - 1,2,5,6 - tetrahydro - 1 - pyridinyl and azabicyclo[3.2.2]nonan - 3 - yl; and when —$C_nH_{2n}$—$NR_3R_4$ is taken together are (2 - pyrrolidinyl) lower alkyl, (3 - pyrrolidinyl) lower alkyl, (1 - benzylpyrrolidinyl) lower alkyl, [1 - (halobenzyl)pyrrolidinyl] lower alkyl, [1 - (lower alkoxybenzyl)pyrrolidinyl] lower alkyl, [1 - (lower alkylbenzyl)pyrrolidinyl] lower alkyl, piperidinylalkyl, (1 - benzylpiperidinyl) lower alkyl, [1- (halobenzyl(piperidinyl] lower alkyl, [1 - (lower alkoxybenzyl)piperidinyl] lower alkyl, [1 - (lower alkylbenzyl)- piperidinyl] lower alkyl; and pharmaceutically acceptable addition salts thereof.

The compounds of the present invention, in general, may be solids or liquids at room temperature as their free bases. As such, they are relatively insoluble in water but are soluble in or miscible with most organic solvents such as, for example, lower alkyl alcohols, esters, acetone, chloroform and the like. These compounds form acid addition salts with strong acids such as hydrochloric acid, sulfuric acid, perchloric acid and also with fumaric and maleic acids and the like. These salts are, in general, soluble in water, methanol, ethanol, etc., but relatively insoluble in benzene, ether, petroleum ether, and the like.

The compounds of the present invention possess central nervous system (CNS) activity at non-toxic doses and, as such, are useful as highly active tranquilizers and CNS depressants. The compounds have been tested pharmacologically and found to have the above properties which show a desirable wide spread between doses producing depressant or sedative actions and toxic symptoms such as paralysis or lethality. They are also analgesics.

The CNS depressant properties, such as hypnotic and muscle relaxant type activity, are indicated by several procedures. For example, a test which indicates hypnotic and/or muscle relaxant type activity is represented by the following rod walking test. Groups of 6 mice each are tested for their ability to walk across a horizontal rod in a normal manner after receiving graded intraperitoneal doses of a test compound. A median effective dose, rod walking dose (RWD) is estimated.

A test which indicates tranquilizing activity is represented by a measure of the reduction in motor activity. One-half this dose is given to a group of 5 mice and a 5 minute count of motor activity is recorded (actophotometer). Counts of $\leq 250$ are considered to indicate a specific reduction (more than two standard deviations) of activity at a dose causing only minimal impairment of neurological function as measured by rod walking ability. Compounds that appeared to reduce motor activity ($\leq 250$ count) are administered to additional groups of 5 mice at graded doses and tested similarly. The motor depressant dose (MDD) which causes a 50% reduction of motor activity (A count of 250) is estimated. The use of reduced motor activity as a measure of tranquilizing activity has been described by W. D. Gray, A. C. Osterberg and C. E. Rauh, Archives Internationales de Pharmacodynamie et de Therapie, vol. 134, p. 198 (1961) and by W. J. Kinnard and C. J. Carr, Journal of Pharmacology and Experimental Therapeutics, vol. 121, p. 354 (1957).

The compounds of this invention have also been found to be active analgesics. The compounds are tested by a modification of the method described by E. Siegmund et al., Proc. Soc. Expt. Biol. Med., 95, 729 (1957). Briefly the test is described as follows: Two mice are administered the test compound, orally, 30 minutes prior to the intraperitoneal injection of 1 mg./kg. phenyl-p-quinone (PPQ). Fifteen minutes later the mice are observed for a period of 3 minutes and the total number of characteristic writhing episodes for both animals is counted and recorded. The mean number of writhes exhibited by 21 parts of control animals (dosed orally with 2% starch) was 29. For our purposes, any compound that reduces the incidence of writhing to 18 or less is considered active in the (PPQ) test, otherwise the compound is rejected. The following Table 1 summarizes results obtained using the above tests.

TABLE 1.—ACTIVITY OF REPRESENTATIVE COMPOUNDS OF THE PRESENT INVENTION

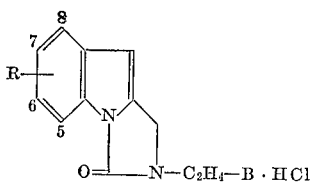

| R | B | CNS depression | | Analgesia, 200 mg./kg. |
|---|---|---|---|---|
| | | $MDD_{50}$* | $RWD_{50}$* | |
| H | 1-pyrrolidinyl | >50 | >100 | A |
| 6-Cl | $(C_2H_5)(CH_3)N-$ | 26 | >100 | A |
| 6-Cl | $(C_2H_5)_2N-$ | >50 | >100 | A |
| 7-$CH_3O$ | $(CH_3)_2N-$ | >35 | 70 | A |
| 8-Cl | $(C_2H_5)_2N-$ | >15 | 30 | A |
| 6-Cl | Piperidino | >23 | 45 | A |
| 6-Cl | 1-pyrrolidinyl | 12 | 24 | A |
| 6-Cl | $(CH_3)_2N-$ | 14 | 62 | A |
| 7-Cl | Piperidino | 26 | 22 | A |

*In mg./kg.

A number of intermediates useful in preparing the final products of the present invention are novel compounds and are a part of the present invention. These intermediates may be illustrated by one of the following formulas:

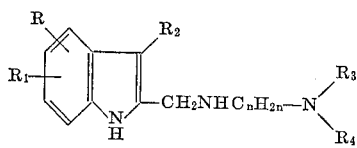

or

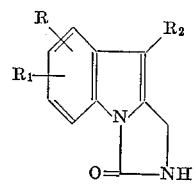

wherein R, $R_1$, $R_2$, $R_3$, $R_4$ and $n$ are as hereinbefore described.

The compounds of this invention may be prepared by the following method which is the preferred method.

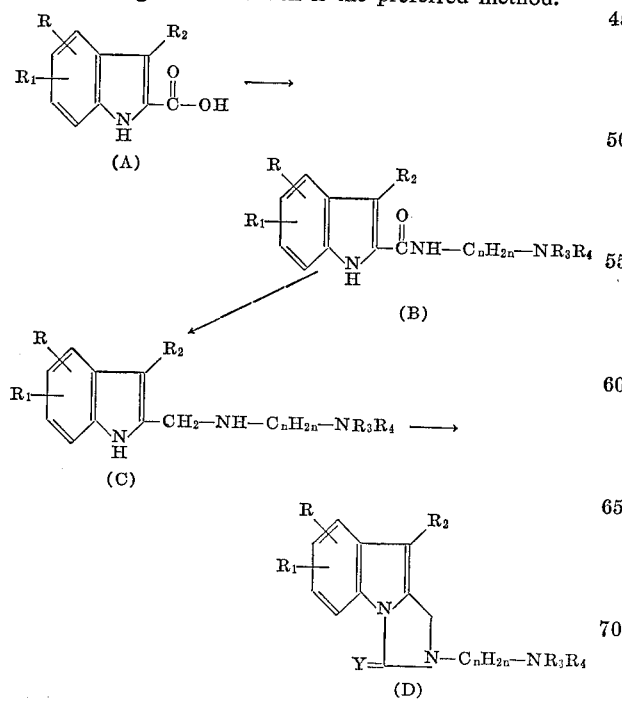

wherein R, $R_1$, $R_2$, $R_3$, $R_4$ $n$ and Y are as defined above.

Compounds of type (A) can be converted to (B) by first converting (A) to an acid chloride, an anhydride, an ester, or an aroylimidazole and then reacting with an aminoalkylamine. Compounds (B) can then be reduced to (C) by reaction in a suitable inert solvent with a reducing agent such as lithium aluminum hydride or diborane. Cyclization to Compounds (D) is effected by reaction with phosgene, thiophosgene, N,N'-carbonyldiimidazole, and the like.

Compounds of this invention may also be prepared by alkylation of the appropriate imidazo[1,5-a]indol-3-one derivatives as follows:

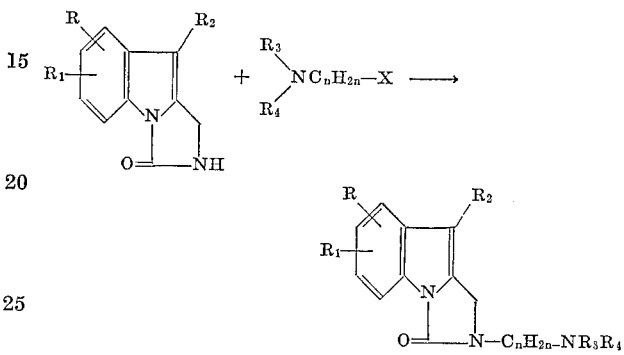

wherein R, $R_1$, $R_2$, $R_3$, $R_4$ and $n$ are as defined above and X is a reactive halogen or arylsulfonyloxy radical. The imidazo[1,5-a]indol-3-one is dissolved in an inert solvent such as, for example, diethyleneglycol dimethyl ether (diglyme) and reacted with a condensing agent such as sodium, sodium hydride or sodamide and then with an appropriate aminoalkyl derivative. The reaction may be carried out at temperatures in the range of 25–200° C. for a period of from about 20 minutes to several hours, or more. The product can be recovered by methods well known in the art.

Another procedure can be used when compounds are desired where $n$ is 1.

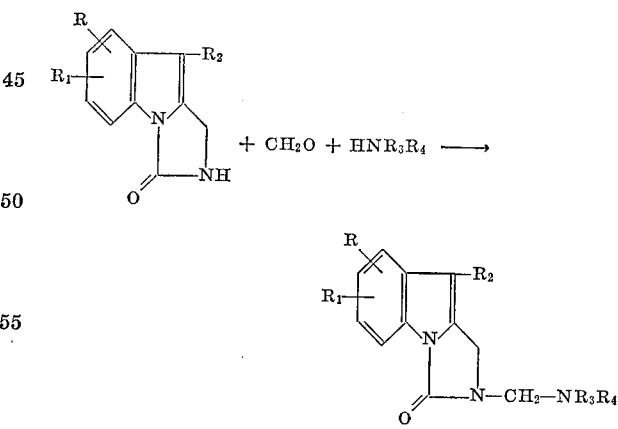

wherein R, $R_1$, $R_2$, $R_3$ and $R_4$ are as defined above.

In this reaction, a 1,2-dihydro-3H-imidazo[1,5-a]indol-3-one, formaldehyde and an amine are allowed to react, usually in an inert solvent such as ethanol. A temperature range of from about 30° C. to 100 C. for a period of from 10 minutes to several hours is most satisfactory.

The products of the present invention can be incorporated in various pharmaceutical forms such as tablets, capsules, pills and so forth, for immediate or sustained release, by combining with suitable carriers. They may be in the form of dosage units for a single therapeutic dose or in small units for multiple dosages or in larger units for division into single doses. The effective therapeutic dose may range from 10 to 500 mg. in warmblooded animals. Obviously, in addition to the therapeutic agent there may be present excipients, binders, fillers and other therapeutically inert ingredients necessary in the formulation of the desired pharmaceutical preparation.

DETAILED DESCRIPTION

The following specific examples illustrate the preparation of representative compounds of the present invention. Parts are by weight unless otherwise indicated.

EXAMPLE I

Preparation of 2-(2-dimethylaminoethyl)1,2-dihydro-3H-imidazo[1,5-a]indol-3-one

A solution of 10 parts of N,N'-carbonyldiimidazole in 100 parts of tetrahydrofuran is added to a solution of 10 parts of 2 - [(2 - dimethylaminoethyl)aminomethyl] indole in 50 parts of tetrahydrofuran. The mixture is allowed to stand at room temperature for 18 hours and is then heated at reflux temperature for 2 hours. The solvent is distilled off and the residue is warmed with 100 ml. of water and extracted with ether or benzene. The organic layer is washed with saturated salt solution, dried over magnesium sulfate and concentrated. The residue is recrystallized from ethyl acetate and 2 - (2 - dimethylaminoethyl) - 1,2 - dihydro - 3H-imidazo[1,5-a]indol-3-one, melting point 74–76° C. is obtained.

The maleate salt of the above compound melts at 182–184° C.

EXAMPLE II

Preparation of 6-chloro-2-(2-dimethylaminoethyl)-1,2-dihydro-3H-imidazo[1,5-a]indol-3-one The above compound, melting point 92–93° C. is obtained when 6 - chloro - 2 - [(2-dimethylaminoethyl) aminomethyl]indole, boiling point 162–168° C./0.88 mm., is substituted for 2 - [(2 - dimethylaminoethyl)aminomethyl]indole in the procedure of Example 1. The above compound has strong tranquilizer activity.

The hydrochloride salt of the above compound decomposes at about 245° C.

EXAMPLE III

Preparation of 7-chloro-2-(2-dimethylaminoethyl)-1,2-dihydro-3H-imidazo[1,5-a]indol-3-one When 5 - chloro - 2 - [(2-dimethylaminoethyl)aminomethyl]indole, boiling point 170–180° C./0.05 mm. is substituted for 2 - [(2 - dimethylaminoethyl)aminomethyl]indole in the procedure of Example I, the above compound, melting point 80–81° C. is obtained.

EXAMPLE IV

Preparation of 7-methoxy-2-(2-dimethylaminoethyl)-1,2-dihydro-3H-imidazo[1,5-a]indol-3-one If the 2 - [(2 - dimethylaminoethyl)aminomethyl] indole is replaced by 5 - methoxy - 2 - [(2-dimethylaminoethyl)aminomethyl]indole, boiling point 180°/0.08 mm., in the procedure of Example I, the above compound is obtained. The hydrochloride melts at 226–228° C. The above compound shows analgesic activity.

EXAMPLE V

Preparation of 6-chloro-2-[2-(1-pyrrolidinyl)ethyl]-1,2-dihydro-3H-imidazo[1,5-a]indol-3-one hydrochloride The above compound, melting point 243–245° C., dec., is obtained when the 2 - [(2 - dimethylaminoethyl)aminomethyl]indole is replaced by 6 - chloro - 2 - {[2-(1-pyrrolidinyl)ethyl]aminomethyl}indole in the procedure of Example I. This compound has strong tranquilizer activity as well as analgesic activity.

EXAMPLE VI

Preparation of 6-chloro-2-(2-piperidinoethyl)-1,2-dihydro-3H-imidazo[1,5-a]indol-3-one If 6 - chloro - 2 - [(2-piperidinoethyl)aminomethyl] indole is substituted for 2 - [(2 - dimethylaminoethyl) aminomethyl]indole in the procedure of Example I, the above compound, melting point 118–120° C. is obtained.

The hydrochloride salt melts at 269–271° C. This compound has both tranquilizer and analgesic activity.

EXAMPLE VII

Preparation of 6-chloro-2-(2-morpholinoethyl)-1,2-dihydro-3H-imidazo[1,5-a]indol-3-one hydrochloride The above compound, melting point 183–185° C. is obtained when 6 - chloro - 2 - [(2-morpholinoethyl)-aminomethyl]indole is substituted for 2 - [(2 - dimethylaminoethyl)aminomethyl]indole in the procedure of Example I. This compound is an active analgesic.

EXAMPLE VIII

Preparation of 7-chloro-2-(2-piperidinoethyl)-1,2-dihydro-3H-imidazo[1,5-a]indol-3-one hydrochloride When 5 - chloro - 2 - [(2-piperidinoethyl)aminomethyl]indole is substituted for 2[(2 - dimethylaminoethyl) aminomethyl]indole in the procedure of Example I, the above compound, melting point 275–280° C., is obtained. This compound is active as an analgesic and enhances morphine analgesia.

EXAMPLE IX

Preparation of 8-chloro-2-[2-(1-pyrrolidinyl)ethyl]-1,2-dihydro-3H-imidazo[1,5-a]indol-3-one The above compound, melting point 101–103° C., is obtained when 4 - chloro - 2 - {[2-(1-pyrrolidinyl)ethyl] aminomethyl}indole is treated with N,N' - carbonyldiimidazole using the procedure of Example I.

EXAMPLE X

Preparation of 6 - chloro - 2 - (3-dimethylaminopropyl)-1,2 - dihydro - 3H - imidazo[1,5 - a]indol-3-one hydrochloride If the 2 - [(2 - dimethylaminoethyl)aminomethyl] indole is replaced by 6 - chloro - 2 - [(3-dimethylaminopropyl)aminomethyl]indole in the procedure of Example I, the above compound, melting point 250–252° C. is obtained.

EXAMPLE XI

Preparation of 6-bromo-2-(4-dimethylaminobutyl)1,2-dihydro-3H-imidazo[1,5-a]indol-3-one When the 2 - [(2 - dimethylaminoethyl)aminomethyl] indole is replaced by 6 - bromo - 2 - [(4-dimethylaminobutyl)aminomethyl]-indole in the procedure of Example I, the above compound is obtained.

EXAMPLE XII

Preparation of 6-fluoro-2-(2-hexamethyleneiminoethyl)-1,2-dihydro-3H-imidazo[1,5-a]indol-3-one The above compound is obtained when 6 - fluoro-2- [(2 - hexamethyleneiminoethyl)aminomethyl]indole is treated with N,N'-carbonyldiimidazole by the method of Example I.

EXAMPLE XIII

Preparation of 6 - trifluoromethyl - 2 - (2-allylmethylaminopropyl) - 1,2 - dihydro - 3H-imidazo[1,5-a]indol-3-one When 6-trifluoromethyl-2-[(2-allylmethylaminopropyl)-aminomethyl]indole is treated with N,N'-carbonyldiimidazole by the procedure of Example I, the above compound is obtained.

EXAMPLE XIV

Preparation of 6 - methyl - 2 - [2-(cyclohexyl)methylaminoethyl] - 1,2 - dihydro - 3H-imidazo[1,5-a]indol-3-one If 6-methyl-2-{[2-(cyclohexyl)methylaminoethyl]aminomethyl} indole is treated with N,N'-carbonyldiimidazole by the procedure of Example I, the above compound is obtained.

EXAMPLE XV

Preparation of 6-chloro-2-(2-piperidinoethyl)-1,2-dihydro-3H-imidazo[1,5-a]indol-3-one A solution of 7.0 parts of 92% N,N'-carbonyldiimidazole in 70 parts of tetrahydrofuran is added with cooling to a mixture of 6.5 parts of 2-aminomethyl-6-chloroindole and 30 parts of benzene. The reaction mixture is stirred at room temperature for 18 hours, heated at reflux temperature for 4 hours, and concentrated. The crystalline residue is warmed with 60 parts of water, filtered and recrystallized from ethyl acetate. Purified 6-chloro-1,2-dihydro-3H-imidazo[1,5-a]indol-3-one melts at 216–220° C.

A mixture of 2.1 parts of the above intermediate, 0.48 part of 50% sodium hydride (in mineral oil) and 30 parts of diglyme is cooled and a solution of 1.5 parts of 2-piperidinoethyl chloride in 20 parts of diglyme is added. The reaction mixture is heated for 5 hours and filtered hot. The mother liquor is concentrated to remove the solvent. The residue is triturated with an excess of 2 N ethanolic hydrogen chloride and then with ether. The ether layer is decanted off and the residue is triturated twice more with ether. The hydrochloride salt is dissolved in water, filtered and treated with 5 N sodium hydroxide, and the desired product is extracted into chloroform. When the chloroform solution is concentrated, 6-chloro-2 - (2 - piperidinoethyl)-1,2-dihydro-3H-imidazo[1,5-a]indol-3-one is obtained. The hydrochloride is prepared by addition of ethanolic hydrogen chloride and purified by recrystallization from ethanol, melting point 269–271° C.

EXAMPLE XVI

Preparation of 8-chloro-2-(2-benzylmethylaminoethyl)-1,2-dihydro-3H-imidazo[1,5-a]indol-3-one hydrochloride The above compound, melting point 224–227° C., is obtained when 2-benzylmethylaminoethyl chloride is treated with 8 - chloro-1,2-dihydro-3H-imidazo[1,5-a]indol-3-one in the procedure of Example XV.

EXAMPLE XVII

Preparation of 6-chloro-2-(2-phenethylmethylaminoethyl)-1,2-dihydro-3H-imidazo[1,5-a]indol-3-one When 2-(phenethylmethylamino)ethyl chloride is substituted for 2-piperidinoethyl chloride in the procedure of Example XV, the above compound is obtained.

EXAMPLE XVIII

Preparation of 6-chloro-2{2-[(cyclopropylmethyl)methylamino] - ethyl} - 1,2-dihydro-3H-imidazo[1,5-a]indol-3-one This compound is obtained when 2-[(cyclopropylmethyl)-methylamino]ethyl chloride is substituted for 2-piperidinoethyl chloride in the procedure of Example XV.

EXAMPLE XIX

Preparation of 8-chloro-2-(2-diethylaminoethyl)-1,2-dihydro-3H-imidazo[1,5-a]indol-3-one hydrochloride When 2-aminomethyl-4-chloroindole is treated with N,N'-carbonyldiimidazole as described in Example XV, 8-chloro - 1,2-dihydro-3H-imidazo[1,5-a]indol-3-one, melting point 234–236° C., is obtained.

If this intermediate is further treated with 2-diethylaminoethyl chloride and sodium hydride, 8-chloro-2-(2-diethylaminoethyl) - 1,2-dihydro-3H-imidazo[1,5-a]indol-3-one hydrochloride, melting point 166–168° C., is obtained.

EXAMPLE XX

Preparation of 8-chloro-2-[2-(4-methylpiperidino)ethyl]-1,2-dihydro-3H-imidazo[1,5-a]indol-3-one If 8 - chloro-1,2-dihydro-3H-imidazo[1,5-a]indol-3-one (Example XIX) is treated with 2-(4-methylpiperidino) ethyl chloride by the procedure of Example XV, this product is obtained.

EXAMPLE XXI

Preparation of 7 - chloro - 2-[2-(2-methyl-1-pyrrolidinyl) ethyl]-1,2-dihydro-3H-imidazo[1,5-a]indol-3-one When 2-aminomethyl-5-chloroindole is treated with N,N'-carbonyldiimidazole as disclosed in Example XV, 7-chloro-1,2-dihydro-3H-imidazo[1,5-a]indol-3-one, melting point 215–217° C., is obtained.

If this intermediate is further treated with 2-(2-methyl-1-pyrrolidinyl)ethyl chloride and sodium hydride in diglyme, 7-chloro-2-[2-(2-methyl-1-pyrrolidinyl)ethyl]-1,2-dihydro-3H-imidazo[1,5-a]indol-3-one is obtained.

EXAMPLE XXII

Preparation of 7 - chloro - 2-[3-(1-phenyl-4-piperazinyl) propyl]-1,2-dihydro-3H-imidazo[1,5-a]indol-3-one The above compound is obtained when 3-(1-phenyl-4-piperazinyl)propyl chloride is treated with 7-chloro-1,2-dihydro-3H-imidazo[1,5-a]indol-3-one (Example XXI), by the procedure of Example XV.

EXAMPLE XXIII

Preparation of 2-[2-(2,6-dimethylmorpholino)ethyl]-1,2-dihydro-3H-imidazo[1,5-a]indol-3-one When 2-aminomethylindole is treated with N,N'-carbonyldiimidazole by the procedure of Example XV, 1,2-dihydro-3H-imidazo[1,5-a]indol-3-one, melting point 226–228° C. is obtained.

If this intermediate is treated with 2-(2,6-dimethylmorpholino)ethyl chloride by the procedure of Example XV, 2 - [2-(2,6-dimethylmorpholino)ethyl]-1,2-dihydro-3H-imidazo[1,5-a]-indol-3-one is obtained.

EXAMPLE XXIV

Preparation of 2-(1-benzyl-2-pyrrolidinylmethyl)-1,2-dihydro-3H-imidazo[1,5-a]indol-3-one The above compound is obtained when 1-benzyl-2-pyrrolidinylmethyl chloride is treated with 1,2-dihydro-3H-imidazo[1,5-a]indol-3-one (Example XXIII) by the procedure of Example XV.

EXAMPLE XXV

Preparation of 2-(1-p-chlorobenzyl-3-pyrrolidinylmethyl) 1,2-dihydro-3H-imidazo[1,5-a]indol-3-one This compound is obtained when 1,2-dihydro-3H-imidazo[1,5-a]indol-3-one is treated with 1-p-chlorobenzyl-3-pyrrolidinylmethyl chloride by the procedure of Example V.

EXAMPLE XXVI

Preparation of 2 - (1-m-fluorobenzyl-3-pyrrolidinylmethyl)-1,2-dihydro-3H-imidazo[1,5-a]indol-3-one The above compound is obtained when 1,2-dihydro-3H-imidazo[1,5-a]indol-3-one is treated with 1-m-fluorobenzyl-3-pyrrolidinylmethyl chloride by the procedure of Example XV.

EXAMPLE XXVII

Preparation of 2 - (1-p-ethoxybenzyl-3-pyrrolidinylmethyl)-1,2-dihydro-3H-imidazo[1,5-a]indol-3-one When 1,2-dihydro-3-H-imidazo[1,5-a]indol - 3 - one is treated with 1-p-ethoxybenzyl-3-pyrrolidinylmethyl chloride by the procedure of Example XV, the above compound is obtained.

EXAMPLE XXVIII

Preparation of 6-chloro-2-(1-p-methylbenzyl-3-pyrrolidinylmethyl)-1,2-dihydro-3H-imidazo[1,5-a]indol-3-one The above compound is obtained when 6-chloro-1,2-dihydro-3H-imidazo[1,5-a]indol-3-one is treated with 1-p- methylbenzyl-3-pyrrolidinylmethyl chloride by the procedure of Example XV.

EXAMPLE XXIX

Preparation of 2-(1-benzyl-3-piperidinylmethyl)-1,2-dihydro-3H-imidazo[1,5-a]indol-3-one This compound is obtained when 1,2-dihydro-3H-imidazo[1,5-a]indol-3-one is treated with 1-benzyl-3-piperidinylmethyl chloride by the procedure of Example XV.

EXAMPLE XXX

Preparation of 2-(1-p-chlorobenzyl-2-piperidinylethyl)-1,2-dihydro-3H-imidazo[1,5-a]indol-3-one When 1,2 - dihydro - 3H - imidazo[1,5-a]indol-3-one is treated with 1-p-chlorobenzyl-2-piperidinylethyl chloride by the procedure of Example XV, this compound is obtained.

EXAMPLE XXXI

Preparation of 2-(1-m-bromobenzyl-3-piperidinylmethyl)-1,2-dihydro-3H-imidazo[1,5-a]indol-3-one The above compound is obtained when 1-m-bromobenzyl-3-piperidinylmethyl chloride is treated with 1,2-dihydro-3H-imidazo[1,5-a]indol-3-one by the procedure of Example XV.

EXAMPLE XXXII

Preparation of 2-(p-ethoxybenzyl-2-piperidinylmethyl)-1,2-dihydro-3H-imidazo[1,5-a]indol-3-one If 1,2-dihydro-3H-imidazo[1,5-a]indol-3-one is treated with 1-p-ethoxybenzyl-2-piperidinylmethyl chloride by the procedure of Example XV, the above compound is obtained.

EXAMPLE XXXIII

Preparation of 2-(p-ethoxybenzyl-2-piperidinylmethyl)-1,2-dihydro-3H-imidazo[1,5-a]indol-3-one The above compound is obtained when 1,2-dihydro-3H-imidazo[1,5-a]indol-3-one is treated with 1-p-ethylbenzyl-3-piperidinylmethyl chloride as disclosed in Example XV.

EXAMPLE XXXIV

Preparation of 6,8-dichloro-2-(2-piperidinoethyl)-1,2-dihydro-3H-imidazo[1,5-a]indol-3-one When N,N'-carbonyldiimidazole and 2-aminomethyl-4,6-dichloroindole are treated as described in Example XV, 6,8-dichloro - 1,2-dihydro-3H-imidazo[1,5-a]indol-3-3-one is obtained. If this intermediate is then treated with 2-piperidinoethyl chloride by the procedure of Example XV, 6,8-dichloro-2-(2-piperidinoethyl) - 1,2-dihydro-3H-imidazo[1,5-a]indol-3-one is obtained.

EXAMPLE XXXV

Preparation of 6-chloro-8-methyl-2-(2-piperidinoethyl) 1,2-dihydro-3H-imidazo[1,5-a]indol-3-one The above compound is obtained when 2-aminomethyl-6-chloro-4-methylindole is used in place of 2-aminomethyl-6-chloro-indole in the procedure of Example XV.

EXAMPLE XXXVI

Preparation of 9-methyl-2-(piperidinoethyl)-1,2-dihydro-3H-imidazo[1,5-a]indol-3-one If 2-aminomethyl-3-methylindole is reacted with N,N'-carbonylidiimidazole as described in Example XV, 9-methyl-1,2,-dihydro-3H-imidazo[1,5-a]indol-3-one is obtained. This intermediate is then caused to react with 2-pipedidinoethyl chloride and 9-methyl-2-(2-piperidinoethyl)-1,2-dihydro-3H-imidazo[1,5-a]indol-3-one is isolated.

EXAMPLE XXXVII

Preparation of 6-trifluoromethyl-2-[3-(1-methyl-4-piperazinyl)propyl] - 1,2-dihydro-3H-imidazol[1,5-a]indol-3-one When 2-aminomethyl-6-trifluoromethylindole is treated with N,N'-carbonyldiimidazole as described in Example XV, 6 - trifluoromethyl - 1,2-dihydro-3H-imidazo[1,5-a]indol-3-one is obtained. Further reaction of this intermediate with 3-(1-methyl-4-piperazinyl)propyl chloride yields 6 - trifluoromethyl-2-[3-(1-methyl-4-piperazinyl)propyl]-1,2-dihydro-3H-imidazo[1,5-a]indol-3-one.

EXAMPLE XXXVIII

Preparation of 6 - bromo-2-[2-(4-phenyl-1,2,5,6-tetrahydro - 1-pyridinyl)ethyl]-1,2-dihydro-3H-imidazo[1,5-a] indol-3-one 6 - bromo-1,2-dihydro-3H-imidazo[1,5-a]indol-3-one is obtained when 2-aminomethyl-6-bromoindole is treated with N,N'-carbonyldiimidazole by the procedure of Ex-XV. If this intermediate is then caused to react with 2-(4-phenyl-1,2,5,6-tetrahydro-1-pyridinyl)ethyl chloride, the above product is obtained.

EXAMPLE XXXIX

Preparation of 6 - chloro-2-[2-(4-p-chlorophenyl-1,2,5,6-tetrahydro - 1-pyridinyl)ethyl]-1,2-dihydro-3H-imidazo [1,5-a]indol-3-one The above compound is obtained when 2-piperidinoethyl chloride is replaced by 2-(4-p-chlorophenyl-1,2,5,6-tetrahydro-1-pyridinyl)ethyl chloride in the procedure of Example XV.

EXAMPLE XL

Preparation of 6-chloro-2-[-(4-fluorophenyl-1,2,5,6-tetrahydro - 1 - pyridinyl)ethyl] - 1,2-dihydro-3H-imidazo [1,5-a]indol-3-one When 2-piperidinoethyl chloride is replaced by 2-(4-m-fluorophenyl-1,2,5,6-tetrahydro-1-pyridinyl)ethyl chloride in the procedure of Example XV, this compound is obtained.

EXAMPLE XLI

Preparation of 6 - chloro-2-[2-(4-p-ethoxyphenyl-1,2,5,6-tetrahydro - 1-pyridinyl)ethyl]-1,2-dihydro-3H-imidazo [1,5-a]indol-3-one If 2-(4-p-ethoxyphenyl-1,2,5,6-tetrahydro-1-pyridinyl)-ethyl chloride is used in place of 2-piperidinoethyl chloride in the procedure of Example XV, the above compound is obtained.

EXAMPLE XLII

Preparation of 6-chloro-2-[2-(4-m-trifluoromethylphenyl-1,2,5,6 - tetrahydro-1-pyridinyl)ethyl]-1,2-dihydro-3H-imidazo[1,5-a]indol-3-one The above compound is obtained when 2-piperidinoethyl chloride is replaced by 2 - (4 - m - trifluoromethylphenyl-1,2,5,6-tetrahydro-1-pyridinyl)ethyl chloride in the procedure of Example XV.

EXAMPLE XLIII

Preparation of 6-chloro - 2 - [2-(4-p-ethylphenyl-1,2,5,6-tetrahydro - 1-pyridinyl)ethyl]-1,2-dihydro-3H-imidazo [1,5-a]indol-3-one When 2-piperindinoethyl chloride is replaced by 2-(4-p-ethylphenyl - 1,2,5,6-tetrahydro-1-pyridinyl)ethyl chloride in the procedure of Example XV, the above compound is obtained.

EXAMPLE XLIV

Preparation of 2-[2-(4-p-methoxyphenyl-1-piperazinyl) ethyl]-1,2-dihydro-3H-imidazo[1,5-a]indol-3-one The above compound is obtained when 1,2-dihydro-3H-imidazo[1,5-a]indol-3-one is treated with 2-(4-p-methoxyphenyl-1-piperazinyl)ethyl chloride by the procedure of Example XV.

EXAMPLE XLV

Preparation of 2-[3-(4-m-trifluoromethylphenyl-1-piperazinyl)propyl] - 1,2 - dihydro-3H-imidazo[1,5-a]indol-3-one When 1,2-dihydro-3H-imidazo[1,5-a]indol-3-one and 3-(4-m-trifluoromethylphenyl-1-piperazinyl)propyl chloride are treated by the procedure of Example XV, the above compound is obtained.

EXAMPLE XLVI

Preparation of 2-[3-(4-p-chlorophenyl-1-piperazinyl)propyl]-1,2-dihydro-3H-imidazo[1,5-a]indol-3-one If 1,2-dihydro-3H-imidazo[1,5-a]indol-3-one is treated with 3-(4-p-chlorophenyl-1-piperazinyl)propyl chloride by the procedure of Example XV, the above compound is obtained.

EXAMPLE XLVII

Preparation of 2-[2-(4-m-bromophenyl-1-piperazinyl)ethyl]-1,2-dihydro-3H-imidazo[1,5-a]indol-3-one The above compound is obtained when 2-(4-m-bromophenyl-1-piperazinyl)ethyl bromide is treated with 1,2-dihydro-3H-imidazo[1,5-a]indol-3-one by the procedure of Example XV.

EXAMPLE XLVIII

Preparation of 2-[2-(4-m-methylphenyl-1-piperazinyl)ethyl]-1,2-dihydro-3H-imidazo[1,5-a]indol-3-one When 1,2 - dihydro - 3H-imidazo[1,5-a]indol-3-one is treated with 2 - (4 - m-methylphenyl-1-piperazinyl)ethyl chloride by the procedure of Example XV, this compound is obtained.

EXAMPLE XLIX

Preparation of 2 - [3-(4-propionoxyethyl-1-piperazinyl)-propyl]-1,2-dihydro-3H-imidazo[1,5-a]indol-3-one The above compound is obtained when 1,2-dihydro-3H-imidazo[1,5-a]indol-3-one is treated with 3-(4-propionoxyethyl-1-piperazinyl)propyl chloride by the procedure of Example XV.

EXAMPLE L

Preparation of 2-[2-(3-azabicyclo[3.2.2]nonan-3-yl)ethyl]-1,2-dihydro-3H-imidazo[1,5-a]indol-3-one When 1,2 - dihydro - 3H - imidazo[1,5-a]indol-3-one is treated with 2-(3-azabicyclo[3.2.2]nonan-3-yl)ethyl chloride by the procedure of Example XV, this compound is obtained.

EXAMPLE LI

Preparation of 2-[3-(4-hydroxyethyl-1-piperazinyl)propyl]-1,2-dihydro-3H-imidazo[1,5-a]indol-3-one The above compound is obtained when 3-(4-hydroxyethyl-1-piperazinyl)propyl chloride is treated with 1,2-dihydro-3H-imidazo[1,5-a]indol-3-one by the procedure of Example XV.

EXAMPLE LII

Preparation of 2-(2-methylaminoethyl)-1,2-dihydro-3H-imidazo[1,5-a]indol-3-one

A mixture of 10 parts of 2 - (2 - benzylmethylaminoethyl)-1,2-dihydro-3H-imidazo[1,5-a]indol-3-one, 1 part of 10% palladium-on-carbon catalyst, and 150 parts of 90% ethanol is shaken in a Parr hydrogenator under about 3 atmospheres of hydrogen pressure until one molar equivalent of hydrogen is absorbed. The catalyst is filtered off and the filtrate is concentrated to remove the 2-(2-methylaminoethyl) - 1,2-dihydro-3H-imidazo[1,5-a]indol-3-one. This product can be further purified by partition chromatography through a diatomaceous earth column.

EXAMPLE LIII

Preparation of 2-(3-piperazinylpropyl)-1,2-dihydro-3H-imidazo[1,5-a]indol-3-one

The above compound is obtained when 2-[3-(4-benzyl-1-piperazinyl)propyl] - 1,2 - dihydro-3H-imidazo[1,5-a]indol-3-one is reduced by the procedure of Example LII.

EXAMPLE LIV

Preparation of 2-(2-pyrrolidinylmethyl)-1,2-dihydro-3H-imidazo[1,5-a]indol-3-one When 2 - (1-benzyl-2-pyrrolidinylmethyl)-1,2-dihydro-3H-imidazo[1,5-a]indol-3-one is reduced as described in the procedure of Example LII, the above compound is obtained.

EXAMPLE LV

Preparation of 2-(3-pyrrolidinylmethyl)-1,2-dihydro-3H-imidazo[1,5-a]indol-3-one If 2 - (1-benzyl-3-pyrrolidinylmethyl)-1,2-dihydro-3H-imidazo[1,5-a]indol-3-one is reduced by the procedure of Example LII, the above compound is obtained.

EXAMPLE LVI

Preparation of 2-(3-piperidinylmethyl)-1,2-dihydro-3H-imidazo[1,5-a]indol-3-one

The above compound is obtained when 2-(1-benzyl-3-piperidinylmethyl) - 1,2-dihydro-3H-imidazo[1,5-a]indol-3-one is reduced by the procedure of Example LII.

EXAMPLE LVII

Preparation of 2-(2-dimethylaminoethyl)-1,2-dihydro-3H-imidazo-[1,5-a]indol-3-thione A mixture of 5 parts of 2-(dimethylaminoethyl)-1,2-dihydro-3H-imidazo[1,5-a]indol-3-one, 5 parts of phosphorous pentasulfide and 25 parts of xylene is heated at reflux temperature for 28 hours. A mixture of 75 parts of 2 N sodium hydroxide and 200 parts of benzene is added and the mixture is warmed and triturated until the product dissolves in the benzene layer. The organic layer is washed with water and concentrated to remove the solvent. The crude 2-(2-dimethylaminoethyl)1,2-dihydro-3H-imidazo[1,5-a]indol-3-thione is further purified by partition chromatography through a column containing diatomaceous earth.

EXAMPLE LVIII

Preparation of 7-chloro-2-piperidinomethyl-1,2-dihydro-3H-imidazo[1,5-a]indol-3-one hydrochloride A mixture of 1.03 parts of 7-chloro-1,2-dihydro-3H-imidazo[1,5-a]indol-3-one, 0.5 part of piperidine, 0.40 part of 37% formaldehyde and 50 parts of ethanol is heated on the steam bath for 4 hours and then filtered to remove any insoluble material. The mother liquor is concentrated to an oil, which is dissolved in 5 parts of ethanol and treated with ethanolic hydrogen chloride. The precipitate is filtered off and recrystallized from methanol. The 7-chloro-2-piperidinomethyl-1,2-dihydro-3H-imidazo[1,5-a]indol-3-one hydrochloride melts at 200–203° C.

EXAMPLE LIX

Preparation of 2-(2-dimethylaminoethyl)-6-methylthio-1,2-dihydro-3H-imidazo[1,5-a]indol-3-one The above compound is obtained when 2-[(2-dimethylaminoethyl)aminomethyl]-6-methylthioindole is treated with N,N'-carbonyldiimidazole by the procedure of Example I.

EXAMPLE LX

Preparation of 2-[2-(1-pyrrolidinyl)ethyl]-1,2-dihydro-3H-imidazo[1,5-a]indol-3-one This compound is obtained when 2-{[2-(1pyrrolidinyl)-ethyl]aminomethyl}indole is treated with N,N' - carbonyldiimidazole by the procedure of Example I. The hydrochloride melts at 232° C.

EXAMPLE LXI

Preparation of 2-(2-piperidinoethyl)-1,2-dihydro-3H-imidazo[1,5-a]indol-3-one

When 2-[(2-piperidinoethyl)aminomethyl]indole and N,N'-carbonyldiimidazole are reacted as described in Example I, the above compound is obtained. The hydrochloride salt melts at 219–221° C.

EXAMPLE LXII

Preparation of 6-chloro-2-(2-diethylaminoethyl)-1,2-dihydro-3H-imidazo[1,5-a]indol-3-one The above compound is obtained when 2-diethylaminoethyl chloride is substituted for 2-piperidinoethyl chloride in the procedure of Example XV. The hydrochloride salt melts at 194–196° C.

EXAMPLE LXIII

Preparation of 6-chloro-2-(2-ethylmethylaminoethyl)-1,2-dihydro-3H-imidazo[1,5-a]indol-3-one When 2-(ethylmethylamino)ethyl chloride is substituted for 2-piperidino ethyl chloride in the procedure of Example XV, the above compound is obtained. The hydrochloride melts at 214–216° C.

What is claimed is:

1. An imidazo[1,5-a]indole of the formula:

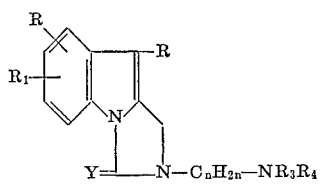

wherein R and $R_1$ are selected from the group consisting of hydrogen, chloro, bromo, fluoro, lower alkyl, lower alkoxy, lower alkylthio and trifluoromethyl; $R_2$ is selected from the group consisting of hydrogen and lower alkyl; Y is selected from the group consisting of oxygen or sulfur; $n$ is an integer of 1 to 4; and $R_3$ and $R_4$ are selected from the group consisting of hydrogen, lower alkyl, lower alkenyl, cyclohexyl, phenyl lower alkyl, lower cycloalkylmethyl, and when taken together with the nitrogen, are 1-pyrrolidinyl, lower alkyl-1-pyrrolidinyl, piperidino, lower alkylpiperidino, morpholino, lower alkylmorpholino, hexamethyleneimino, 1-piperazinyl, 1-(lower alkyl)-4-piperazinyl, 1-(hydroxy lower alkyl)-4-piperazinyl, 1-(lower alkanoyloxyloweralkyl)-4-piperazinyl, 1-phenyl-4-piperazinyl, 1-(lower alkoxyphenyl)-4-piperazinyl, 1-trifluoromethylphenyl-4-piperazinyl, 1-(lower alkylphenyl)-4-piperazinyl, 1-chlorophenyl-4-piperazinyl, 1-bromophenyl-4-piperazinyl and pharmaceutically acceptable addition salts thereof.

2. The imidazo[1,5-a]indole according to claim 1: 6-chloro-2-(2-dimethylaminoethyl)-1,2-dihydro-3H-imidazo[1,5-a]indol-3-one.

3. The imidazo[1,5-a]indole according to claim 1: 6-chloro-2-[2-(1-pyrrolidinyl)ethyl]-1,2-dihydro-3H-imidazo[1,5-a]indol-3-one.

4. The imidazo[1,5-a]indole according to claim 1: 6-chloro-2-(2-piperidinoethyl)-1,2-dihydro-3H-imidazo[1,5-a]indol-3-one.

5. The imidazo[1,5-a]indole according to claim 1: 7-chloro-2-(2-piperidinoethyl)-1,2-dihydro-3H-imidazo[1,5-a]indol-3-one.

6. The imidazo[1,5-a]indole according to claim 1: 8-chloro-2-[2-(1-pyrrolidinyl)ethyl]-1,2-dihydro-3H-imidazo[1,5-a]indol-3-one.

7. The imidazo[1,5-a]indole according to claim 1: 7-methoxy-2-(2-dimethylaminoethyl)-1,2-dihydro-3H-imidazo[1,5-a]indol-3-one.

8. The imidazo[1,5-a]indole according to claim 1: 6-chloro-2-(2-methylethylaminoethyl)-1,2-dihydro-3H-imidazo[1,5-a]indol-3-one.

9. The imidazo[1,5-a]indole according to claim 1: 6-chloro-2-(2-diethylaminoethyl)-1,2-dihydro-3H-imidazo[1,5-a]indol-3-one.

10. The imidazo[1,5-a]indole according to claim 1: 8-chloro-2-(2-diethylaminoethyl)-1,2-dihydro-3H-imidazo[1,5-a]indol-3-one.

References Cited

UNITED STATES PATENTS

| | | | |
|---|---|---|---|
| 3,454,579 | 7/1969 | Wright | 260—288 |
| 3,494,922 | 2/1970 | Wright | 260—256.4 |
| 3,334,113 | 8/1967 | Houlihan | 260—309.7 |

OTHER REFERENCES

Johnson et al., J. Am. Chem. Soc. 73, 3749–51 (1951).

HENRY R. JILES, Primary Examiner

G. T. TODD, Assistant Examiner

U.S. Cl. X.R.

260—247.1, 247.2, 268, 293.4 294.8, 295, 309.7; 424—248, 250, 267, 273